United States Patent
Kelley et al.

(10) Patent No.: US 6,319,618 B1
(45) Date of Patent: Nov. 20, 2001

(54) FISH TAPE FOR CONDUIT DISTRIBUTION

(75) Inventors: George R. Kelley, Mt. Pleasant, SC (US); Arthur J. Smoljan, Mokena, IL (US); Manfred Groening, Summerville; Axel V. Ampolini, Mt. Pleasant, both of SC (US)

(73) Assignee: Zapp USA, Inc., Summerville, SC (US)

(*) Notice: Subject to any disclaimer, the term of this patent is extended or adjusted under 35 U.S.C. 154(b) by 0 days.

(21) Appl. No.: 09/253,423

(22) Filed: Feb. 19, 1999

(51) Int. Cl.$^7$ .............. H02G 1/08; B32B 15/04; B32B 15/02
(52) U.S. Cl. .......... 428/600; 428/457; 428/687; 254/134.3 FT
(58) Field of Search .................. 254/134.3 FT; 428/577, 600, 687, 599, 457, 624, 612, 609

(56) References Cited

U.S. PATENT DOCUMENTS

| | | | |
|---|---|---|---|
| 4,759,103 | * 7/1988 | Henderson | 24/236 |
| 4,895,221 | * 1/1990 | Carlson | 184/15.1 |
| 5,284,306 | * 2/1994 | Sangkil | 242/96 |
| 5,562,126 | * 10/1996 | Briand et al. | 138/127 |
| 5,762,321 | 6/1998 | Peterson et al. | 254/134.4 |
| 5,953,944 | * 9/1999 | Groening et al. | 72/40 |

FOREIGN PATENT DOCUMENTS

| | | |
|---|---|---|
| 0445622 | 11/1991 | (EP). |
| 0620627 | 10/1994 | (EP). |
| 51-49159 | * 4/1976 | (JP). |
| 55-50434 | * 4/1980 | (JP). |
| 55-122827 | * 9/1980 | (JP). |
| WO 9409538 | 4/1994 | (WO). |

OTHER PUBLICATIONS

Metal Progress, "Standard Stainless and Heat–Resisting Steels", pp. 60–63, 70–73, Mid–Jun. 1978.*

* cited by examiner

Primary Examiner—John J. Zimmerman
(74) Attorney, Agent, or Firm—Barry G. Magidoff

(57) ABSTRACT

A stainless steel "fish tape" is disclosed. The tape is characterized by a steel formulation of 10 to 20 percent chromium, up to 18 percent nickel, up to 4 percent molybdenum, not more than 0.9% carbon and no more than 0.8% nitrogen. It is critical that the circumference of the tape relative to the cross sectional area of the tape be of a ratio of at least 1.30 and preferably greater than 1.55. In counter distinction to known prior art fish tapes which attempt to achieve a highly smooth surface, the tape of the instant invention is preferably roughened or abraded to improve the ability to carry for lubricants. The lubricant retaining characteristic functions both to reduce friction on insertion of the tape through a conduit and to leave traces of lubricant on the surface of surfaces which have been impacted against the tape whereby the wire which is then drawn through the conduit, will also be lubricated at the critical points in the conduit most likely to cause frictional contact with the wire. The ability to have a roughened surface, without increased corrosion, was clearly advantageous.

7 Claims, 2 Drawing Sheets

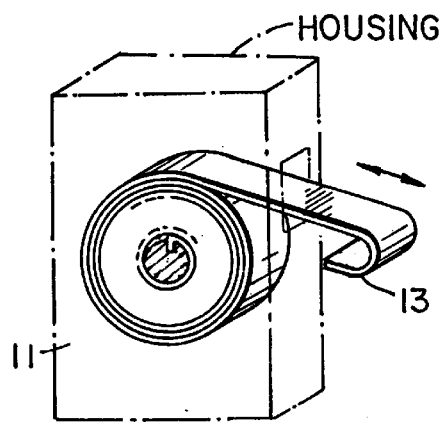
FIG. 1
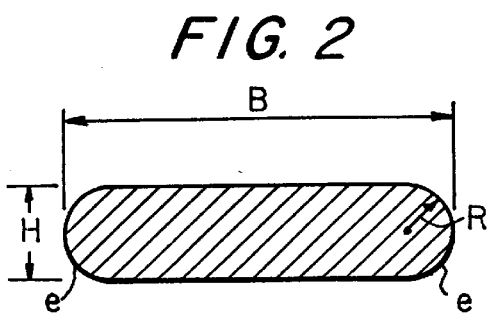
FIG. 2
FIG. 2A
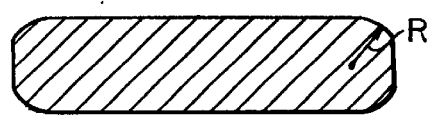
FIG. 2.1
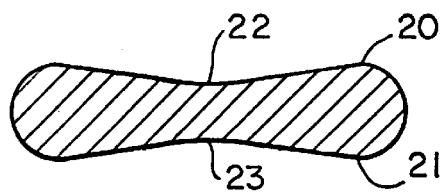
FIG. 3
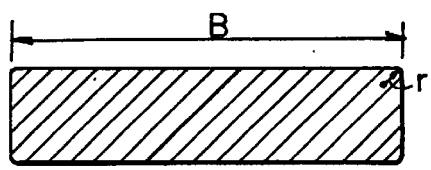
FIG. 4
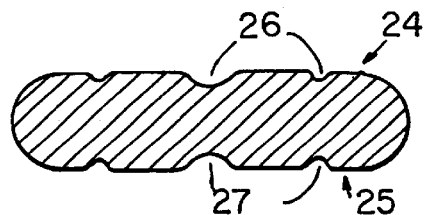
FIG. 5
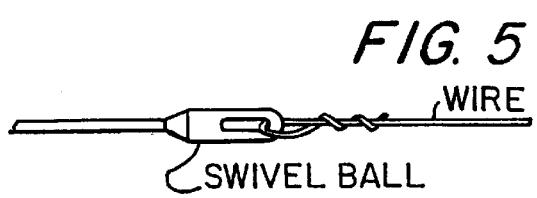
FIG. 6
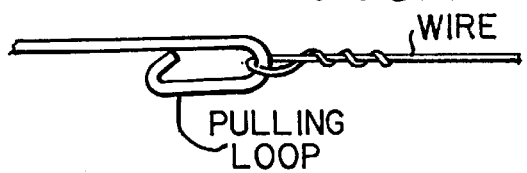
FIG. 7

FISH TAPE FOR CONDUIT DISTRIBUTION

BACKGROUND AND FIELD OF THE INVENTION

The present invention is directed to an article known in the electrical and allied trades as a "fish tape", which is an elongate, flexible tape, or messenger, intended to draw electrical wires, optical cables and the like through tubular conduits emplaced in the walls of buildings. The fish tape, which may be supplied in lengths of up to 200 feet, is advanced through conduits, i.e., from a first junction box to a second remote junction box. The fish tape includes at its rear end portion a holding means for securing wire or cable to be emplaced, i.e., a hook swivel or the like, and at its front end portion, some type of blunt or rounded end. After the wire or cable is secured to the holding means at the rear free end of the tape, the tape is withdrawn carrying with it the wire whereby the wire is disposed in the desired connecting relation between the junction boxes.

PRIOR ART

Conventional fish tapes have been made of a variety of materials. These materials must meet a wide range of service characteristics including high tensile strength, high flexibility enabling the lead end to travel, and the body of the tape to bend, about obstructions and resistance to buckling when a pushing force is exerted on a tape.

The material heretofore regularly employed for the fabrication of fish tape has been carbon steel wire. A major difficulty with such conventional materials is the lack of sufficient corrosion resistance; rust greatly increases the frictional resistance to advancing the tape through the conduits, and in addition runs the risk of contaminating wires or cables already emplaced; a further complication is that the persons handling the wire are dirtied as well. Further, carbon steel fish tapes often leave detritus on the walls or carpeting where used in new installations or installations within existing buildings. Earlier attempts to avoid the corrosion problem utilized so-called "blue finish", or hardened and tempered steel tapes. However, such 'blue' tapes were more costly than regular steel tapes, and did not full resolve the problem: even the 'blue' tapes tended to rust, apparently as a result of their treatment were even more likely to be brittle, and less elastic, and susceptible to failure under stress.

A further concern in limiting the opportunities for alternative materials for tape fabrication, is the need to form the holding means at one end, utilizing the same material of the tape. The holding means usually is formed by bending a free end of the tape to form what is referred to as the "pulling loop". The fabrication of a pulling loop with a conventional carbon steel tape is readily accomplished by heating and cooling prior to bending the form hook. These operations must be carefully conducted in order not to compromise the tensile strength or durability of the critical hook end.

The difficulty of running wires and data transmission cables such as fiber optic cables by conventional tape means has lead to many ideas to reduce the friction problem of the fish tape. By way of example, U.S. Pat. No. 1,597,706(?) proposed coating internal surface of the conduits with a wax coating to reduce feed friction. However, the use of a wax in addition to creating a fire hazard, can be counter-productive under certain circumstances, in that friction can actually be increased where dust and dirt become embedded in the wax.

It has also been proposed to reduce stress during the pulling of cable through conduit, especially when installing fiber optic data transmission cables, which are far more fragile than conventional wires, by injecting a liquid into the duct line, thereby reducing the friction encountered during feed. The problem with this proposed solution resides in the fact that the lubricating fluid must be removed after cable emplacement and the conduit completely and carefully dried. (see EP 4445622 and EP 665993). This is clearly a time consuming and costly procedure.

In EP 620627, it is proposed to utilize compressed air as a conveying medium for communication cables within conduits. This method is said to reduce the buildup of a static charge in the conduit. However, the method is noisy and results in driving dust through various junction boxes.

Attempts to minimize frictional resistance to pulling the tapes through conduits include cladding tapes with coatings such as nylon; such coatings have enjoyed only limited success since the coatings are readily stripped from the tape where the cable bends around obstacles, thus quickly losing its effect and leaving a residue within the conduit.

SUMMARY OF THE INVENTION

The present invention is directed to an improved fish tape fabricated of stainless steel. More particularly, the invention is directed to a stainless steel fish tape characterized by the composition of the steel, within certain parameters. The desirable steel provides the necessary tensile and compressive strength for the desired thickness and width of the tape, for the desirable bendabililty required for the formation of the pulling loop, the required flexibility to enable the tape to pass beyond and around obstacles in the conduit, and a freedom from corrosion which will ensure low friction feed and a long useful life. The more flexible stainless steel tape also is more easily wound up for easy storage and use.

A further significant advantage of the fish tape of the present invention resides in its versatility, i.e., the ability to prepare the external surfaces of the tape in either a smooth condition, or when additional lubricant, or the like, is needed for the surface treatment of the tape, the surface may be abraded or roughened to provide channels for retaining small amounts of lubricant on the tape surfaces. Not only is the feed of the tape itself facilitated, but also small amounts of the lubricant will be rubbed off from the tape, at the conduit bends, which will coat the precise areas within the conduit where the wires to be pulled through are most likely to rub. In other words, by being capable of providing a roughened external surface, without fear of excessive corrosion, and which can be coated with lubricant, the feed of the tape is facilitated as is the return feed of the wires through the conduit.

In accordance with a further embodiment of the invention, the major surfaces of the tape are provided with one or more longitudinally extending channels. These channels not only provide an additional repository for portions of lubricant, but in addition improve the flexibility of the tape.

It is important in understanding the advance of the instant invention to recognize that the versatility of having the optional capability of being provided with an abraded or roughened surface on the tape, in those circumstances where a surface coating is desirable, is exactly contrary to the requirements for the fish tapes heretofore known. It has been considered necessary to provide surfaces which are as smooth and bright as possible, in order to reduce sites for increased corrosion.

It is accordingly an object of the invention to provide a stainless steel fish tape. A further object of the invention is the provision a fish tape capable of having and maintaining a bright smooth finish, a high degree of flexibility as well as a high tensile strength, throughout its length. It is further an object to provide a fish tape material which can be readily formed into a pull hook at one end without loss of tensile strength or flexible at that crucial location.

A still further object of the invention is the provision of a stainless steel tape which can be given roughened outer surfaces, adapted to receive and retain increments of a lubricant, without significant corrosion occurring. By providing lubricant in this manner, relatively small quantities can be provided to result in the desired decrease in friction without creating sticky surfaces which might collect dirt or other contaminants. The lubricant functions during feed of the tape as a friction reducing medium. The lubricant in addition providing a low friction return path for the tape and wire or optical cable.

BRIEF DESCRIPTION OF THE DRAWINGS

FIG. 1 is a side view of a fish tape in accordance with the present invention.

FIGS. 2.1, 2A, 2 through 4 comprise magnified cross sectional views of the various embodiments taken on the line A—A of FIG. 1.

FIG. 5 is a side view of a swivel ball type lead for the fish tape;

FIG. 6 is a magnified sectional view of the swivel type lead of FIG. 5;

FIG. 7 is a side view of a hook-type lead for the fish tape, bent into a loop shape.

DETAILED DESCRIPTION OF VIEWS

Figure 8:
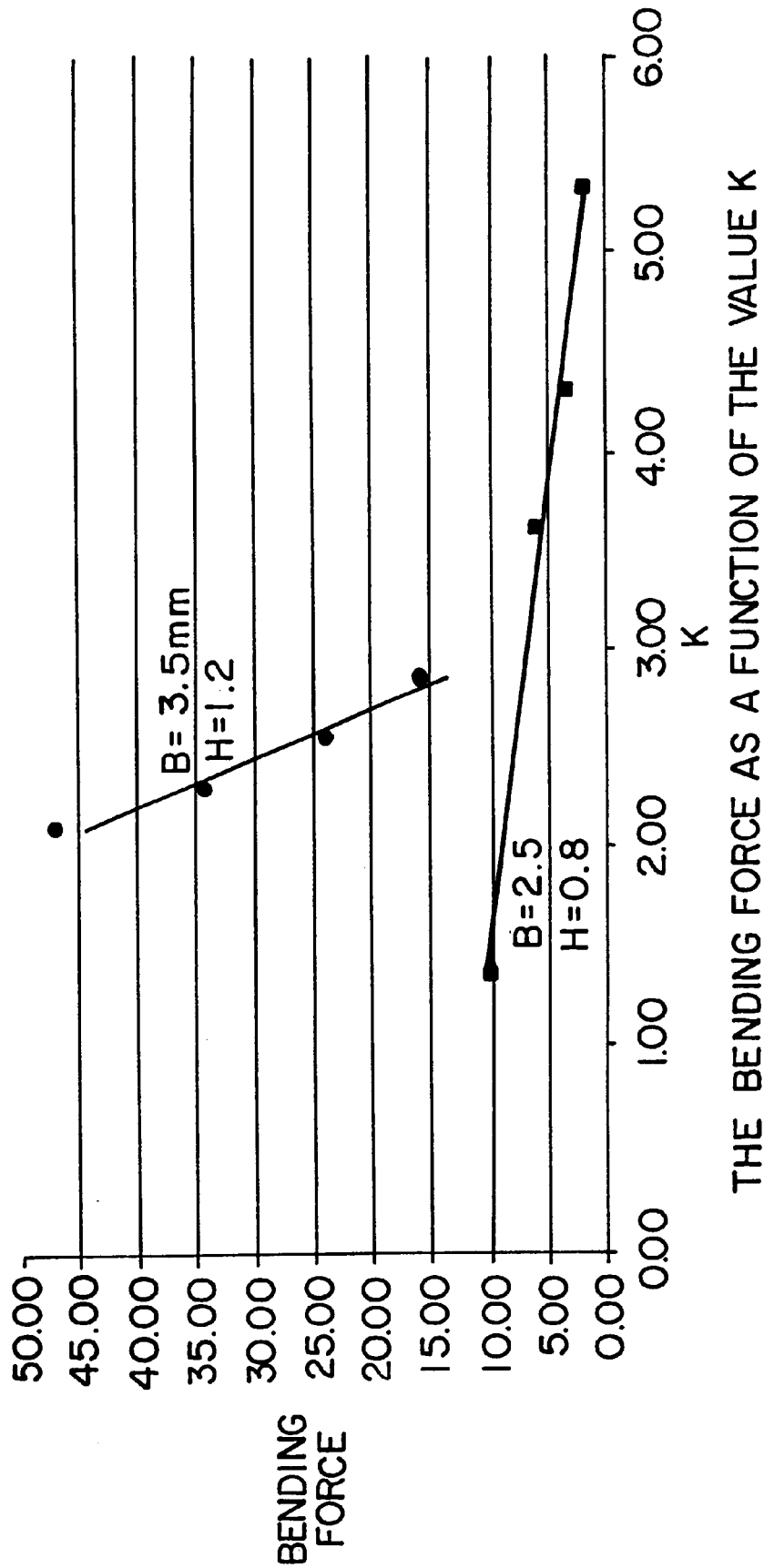
FIG. 8 is a graph showing the bendability of the tape.

Referring to FIG. 1 a fish tape is comprised of an elongate band and typically supplied in coiled configuration 11, having at its lead end 12 a connection 13 to which a wire or conduit to be fed can be attached.

As is well known, the fish tape is used by introducing the lead end of the tape into a conduit and advancing the tape through the conduit until the lead end, e.g., a swivel 12 or hook 16, reaches the desired junction box, or like facility. When the lead end exits from the conduit, the swivel 12 or hook 16 is attached to the lead end of a wire or cable. The wire is then pulled back through the conduit by pulling the tape 11 back into and through the conduit and out the entrance at which the free end of the tape was introduced. The pulled wire can then be connected as desired.

A representative lead end, in the nature of a swivel connection, is shown in FIGS. 5 and 6. The swivel is held onto the tape, by bending the tape 11 into a U-bend 14 at the lead end of the tape, after the flat tape 11 is pulled through the narrow opening at the bottom of the swivel base 30. The large opening at the top of the swivel base has an internal thread 16, which mates with an external thread on the swivel ring 17. The bent end 14 of the tape 11 cannot then readily be pulled out through the end opening. The swivel assembly 12 includes a ring 17, including an aperture 19 for connection to the wire or cable to be pulled. In FIG. 7 is disclosed a hook-type lead connection 114, formed by multiple bends of the end of the tape 11.

In FIGS. 2, 2.1, 2A, 3 and 4 there are disclosed four examples of cross sectional configurations for the tape 11. In each instance, the tape has a width B substantially greater than its thickness H; and in the preferred embodiments, the side edges e are rounded with a radius R, or r.

In the embodiment of FIG. 3 the upper and lower surfaces 20, 21 are depressed at a central portion 22, 23, defining elongate channels on each of the major surfaces. In the embodiment of FIG. 4 the upper and lower major surfaces 24, 25 respectively are provided with a plurality of longitudinally extending channels 26, 27 respectively.

Preferably, the exterior surfaces of the tape are abraded, as by brushing or scouring, or otherwise treated to provide minute surface receptacles for a lubricant composition.

TAPE COMPOSITION

The stainless steel tape is preferably formed of shaped strip or flat wire material having the following composition (by weight): from about 10 to about 26% chromium, from about 3 to about 22% nickel, up to about 4% molybdenum, up to about 16% Manganese, up to about 3% Silicon, and not more than about 0.9% carbon, and not more than about 0.8% nitrogen, but preferably up to about 0.4% carbon or nitrogen. The composition must have a tensile strength greater than 1300 N (newtons/mm$^2$ and preferably greater than 1500 n/mm$^2$), after work hardening, as by drawing or flattening the wire, or by age hardening.

The desired tensile strength is achieved by the effect of the method of manufacturing the tape, having the above composition. Specifically, the tape is formed by drawing a wire rod to the desired diameter of wire, preferably at a temperature above the Ms-temperature, so as to limit any work hardening effect by the drawing. The drawing of the wire preferably is carried out in multiple stages, and most preferably the diameter reduction with each successive draw is not greater than the previous stage drawing. After the wire rod is reduced to the preferred diameter, it is then flattened to the desired tape configuration, shown above, preferably by flat rolling processes. The nominal configuration of the tape prepared as above, and depicted in FIG. 2, preferably should have dimensions which meet the following formulae:

1) B=F×H, wherein F=1 to 12 (and preferably 2 to 5);

B=the maximum width of the tape; and H=the thickness of the tape.

2) Preferably, R is equal to or greater than 0.2×H, but a squared off band can be used where desired, where the corners may be rounded or chamfered; and 3) K=(2H+2B)/B×H, and is greater than 1.3, preferably greater than 1.5, and optimally greater than 3.

The flat rolling is accomplished preferably utilizing alternating horizontal and vertical (or edging) rollers. This enables the manufacture of tape having a variety of edge cross-sections, e.g., flat major and minor surfaces or fully rounded edge surfaces and concave or convex major (top and bottom) surfaces.

The bendability of the fish tape of this invention is shown by the values of FIG. 7. As shown, the greater the value of K, the lower the necessary bending force. The thinner the tape, i.e., the lower the value of H, the lower the bending force. This is limited only by the necessary minimum tensile strength for the tape, i.e., values greater than 1300 N/mm$^2$.

Thus it is critical to the successful functioning of the tape that the ratio of circumference, or perimeter, exceeds the cross sectional area by a factor of at least 1.3 and preferably above 1.55. This ratio (K) for FIGS. 3 and 4 is increased over the ratio of FIG. 2, as a result of the dishing of the upper and lower surfaces (FIG. 3) and the multiple channels (FIG. 4), which increase the effective circumference of the tape. A greater K value, results in a smaller bending force, and advantageous reduction of weight, per unit length. The smaller diameters have sufficient strength to be used for smaller conduits, and cable.

PREFERRED EXAMPLES

Except as may be limited by the claim hereto appended, the examples provided below are incorporated to comply with the requirements of the patent laws and are not to be taken as exclusive of the scope of the invention.

EXAMPLE I

A specific mode of forming a tape in accordance with FIG. 2 will be set forth below. The following procedure will result in the formation of a tape in which the width (B of FIG. 2) is 3.175 millimeter. A round stainless steel rod (AISI 302), having a diameter of 5.5 mm, is provided, having the following composition:

| Chromium | Nickel | Molybdenum | Carbon | Sulfur | Phosphorus | Silicon | Copper | Mn |
|---|---|---|---|---|---|---|---|---|
| 17.15 | 8.15 | 0.139 | 0.1 | 0.0066 | 0.022 | 0.99 | 0.172 | 1.3 |

The above 5.5 mm diameter rod, which was hot-rolled, annealed and passivated with a salt coating, has an initial tensile strength of 650 N/mm$^2$ is then drawn through a series of 6 dies to form a wire having a diameter of 2.53 mm, in the following progression :Step 1, 30% reduction to 4.6 mm diameter; Step 2, 25% reduction to 3.98 mm; Step 3, 25% reduction to 3.45 mm; Step 4, 25% reduction to 2.99 mm; Step 5, 20% reduction to 2.67 mm; and Step 6, 10% reduction to 2.53 mm. The dies are formed of Hard Metal (e.g., Tungsten Carbide), and may be coated, e.g., with Titanium Nitride. The wire is lubricated with Calcium Stearate. The wire is drawn through the dies on a continuous basis, so that the longitudinal speed of the wire at the final stage is 480 m/min.

The 2.53 mm diameter wire is then rolled and flattened in several stages to a tape having flat major surfaces, and usually rounded edges (which are formed inherently in the flattening process) and having the following dimensions: : 3.175 mm×1.58 mm. The tape thus formed has a tensile strength of about 1900 N/mm$^2$. The wire is treated in five (5) process stages by being passed through flat horizontal rollers and concave vertical rollers, alternating at horizontal and vertical axes. The tape is lubricated with a rolling oil, and has a speed through the final stage of 300 m/min. The change in dimensions after each stage are as follows:

| Flat Rolling Step: | 2.53 |
|---|---|
| Roll-Stand #1 | 2.9 × 1.75 mm |
| Edger #1 | 2.85 × 1.77 mm |
| Roll-Stand #2 | 3.0 × 1.65 mm |
| Edger #2 | 2.95 × 1.67 mm |
| Roll-Stand #3 | 3.175 × 1.58 mm |

The vertical axis edge rollers are concave, to form a final edge radius of 0.5H. The final stage of horizontal rollers are textured to roughen the surface of the tape, to an RMS of less than 0.32 microns, measured in a transverse direction.

EXAMPLE II

A second example of a suitable tape is formed from the same stainless steel composition, and drawn to the same final wire diameter of 2.53 mm, and then rolled and flattened, again in multiple stages, to the following dimensions: 0.125 in.×0.0625 in. This product had a tensile strength of about 270,000 psi

EXAMPLE III

A third example of a suitable tape is formed from the same stainless steel composition, and drawn and flat rolled as in Example 1, except that the edge rollers were shaped to form a partially rounded edge surface, having a flat central portion and rounded comers having a radius of R=0.3H, such as is shown in FIG. 2A.

EXAMPLE IV

A fourth example of a suitable tape is formed from the same stainless steel composition, and drawn to the same wire diameter as in Example I, and then flat rolled to the same dimensions and shape. However, the horizontal rollers of 'Stand # 3 are provided with textured surfaces, to give the final tape a surface roughness of RMS greater than 0.32 microns.

EXAMPLE V

A fourth example of a suitable tape is formed from the same stainless steel composition, and drawn to the same wire diameter as in Example I, and then flat rolled to the same dimensions and shape. After flat rolling is completed, the tape is passed under a set of steel brushes (300 series stainless) rotating at about 4200 rpm, and attacking the major surfaces at a brushing angle of 45°. The tape is passed beneath the brushes at a longitudinal speed of about 300 m/min. The final tape has a surface roughness of RMS greater than 0.32 microns.

EXAMPLE VI

A fifth example of a suitable tape is formed from the same stainless steel composition, and drawn to the same wire diameter as in Example I, and then flat rolled to the same final nominal dimensions. The final rolling stage, however, utilizes a set of convex, crown, rollers having textured surfaces. The final tape has the cross-sectional shape as shown in FIG. 3.

EXAMPLE VII–VIII

Example 1 was repeated but utilizing the stainless steel compositions as follows:

| Composition of Steel: | S2 |
|---|---|
| (experimental grade) | |
| C | 0.048 |
| Si | 0.51 |
| Mn | 1.15 |
| P | 0.025 |
| S | 0.008 |

-continued

| Composition of Steel: S2 (experimental grade) | |
|---|---|
| Cr | 18.42 |
| Ni | 9.83 |

| Steel Composition: S3 (experimental grade) | |
|---|---|
| C | 0.098 |
| Si | 0.44 |
| Mn | 6.35 |
| P | 0.022 |
| S | 0.001 |
| Cr | 16.41 |
| Ni | 3.92 |

Substantially, the same results were obtained, although the tape of Example VII had a slightly lower tensile strength, an initial value of 600 N/mm² but sufficient for this purpose; the tape of Example VIII had a greater tensile strength (initially about 800 N/mm²) but lower corrosion resistance, but still far superior to that of the present commercial carbon steel tape. The tape of Example VIII is significantly less costly.

The formation of hook 14 in the stainless steel material of the invention must be affected in a manner different from the formation of a hook for a conventional (carbon steel) tape. With the carbon steel, the steel tape end is first heated to a red heat, before bending, formed and then slowly cooled. In the formation of the hook in the stainless steel fish tape of the instant invention the hook should be first cold formed, then heated to a red heat, and thereafter quenched. This procedure resulted in a tape having the desired high tensile strength required while maintaining the resilience and springy nature for a suitable fish tape. The heating and quenching operation were carried out by conventional means.

Samples of several different tapes made as described above were tested to determine the force needed to bend the tapes 90°. The experimental values were then charted as a function of the value "K" for each tape. The results are shown in FIG. 7, and make clear that the higher the value of K, the lower the bending force, and therefor the greater the desirable bendability of the tape. All of these tapes maintain at least the desired tensile strength, including after formation of the bent pulling end.

Lubricants which are usefully applied to the major surfaces of the fish tape include petroleum lubricants, silicone oils, waxes, or even high viscosity aqueous solutions.

Samples of each of the products from Examples 3 through 6, were treated with a commonly used silicone oil, to form a thin film over the major surfaces. A standard sample of a commercially available carbon steel fish tape was identically treated, and all were drawn through the same conduit used for containing wire in residential and office settings. The force required to pull the tape through was measured in each case. The force required for all of the examples of this invention was from 50 to 72% less than for the same size commercial tape. The products of examples 5 and 6 showed the greatest improvement, which is believed to have resulted from the greater lubricant pickup possible from the roughened surface, and the lack of corrosion on the surfaces. The ability to have a roughened surface, without increased corrosion, was clearly advantageous.

As will be apparent from the preceding disclosure, there is provided a "fish tape" having many desirable properties not found in tapes heretofore known. Specifically, the tape is corrosion resistant, flexible, has high tensile strength, and importantly otherwise smooth major surfaces, free from crusty rust, but which has an ability to retain and distribute as required lubricating material. This facilitates both the emplacement of the fish tape and the retraction of the tape and pulling of the wire.

As will be apparent to those persons skilled in the art, after being familiarized with the instant disclosure, numerous variations in detail may be made without departing from the spirit of the invention. Accordingly, the invention is to be broadly construed within the scope of the appended claims.

What is claimed is:

1. As a new article of manufacture a fish tape comprising an elongate generally flat metal band fabricated of a stainless steel of the following composition by weight: from about 10 to about 26% chromium, from about 3 to about 22% nickel, up to about 4% molybdenum, up to about 16% Manganese, up to about 3 % Silicon, not more than about 0.9% carbon, and not more than about 0.8% nitrogen, the circumference of said tape divided by the cross sectional area of said tape is greater than 1.30 and the band has a tensile strength of at least 1300 N/mm², the tape being characterized in that surfaces of said band are roughened to form lubricant receiving pockets.

2. The article of claim 1 wherein said band has been work hardened by roll forming from a wire to said generally flat configuration.

3. The article of claim 1 wherein side edges of said band are convex in section.

4. The article of claim 3 wherein said band includes one longitudinally extending recessed channel.

5. The article of claim 1 wherein said band contains not more than about 0.4% carbon, and not more than about 0.4% nitrogen.

6. The article of claim 1 wherein side edges of said band are substantially flat.

7. As a new article of manufacture a fish tape comprising an elongate metal band having a pair of opposed major surfaces, and a pair of opposed minor surfaces, extending transversely to the major surfaces, said band is fabricated of a stainless steel of the following composition by weight: from about 10 to about 26% chromium, from about 3 to about 22% nickel, up to about 4% molybdenum, up to about 16% Manganese, up to about 3% Silicon, not more than about 0.9% carbon, and not more than about 0.8% nitrogen, the circumference of said tape divided by the cross sectional area of said tape is greater than 1.30 and the band has a tensile strength of at least 1300 N/mm², the tape being characterized in that surfaces of said band are roughened to form lubricant receiving pockets.

* * * * *